(12) United States Patent
Bai et al.

(10) Patent No.: US 9,965,110 B2
(45) Date of Patent: May 8, 2018

(54) IN-CELL TOUCH SCREEN AND DRIVING METHOD THEREOF

(71) Applicant: Shenzhen China Star Optoelectronics Technology Co., Ltd., Shenzhen, Guangdong (CN)

(72) Inventors: Yujie Bai, Guangdong (CN); Xiang Yang, Guangdong (CN); Feilin Ji, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 185 days.

(21) Appl. No.: 14/425,618

(22) PCT Filed: Dec. 8, 2014

(86) PCT No.: PCT/CN2014/093272
§ 371 (c)(1),
(2) Date: Mar. 3, 2015

(87) PCT Pub. No.: WO2016/082245
PCT Pub. Date: Jun. 2, 2016

(65) Prior Publication Data
US 2016/0147356 A1 May 26, 2016

(30) Foreign Application Priority Data

Nov. 26, 2014 (CN) .......................... 2014 1 0693369

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01)

(58) Field of Classification Search
CPC ....... G06F 3/0412; G06F 3/044; G06F 3/0416
See application file for complete search history.

(56) References Cited

U.S. PATENT DOCUMENTS

2012/0050217 A1* 3/2012 Noguchi ............... G06F 3/0412
345/174
2013/0335338 A1* 12/2013 Lai .......................... G06F 3/044
345/173

(Continued)

FOREIGN PATENT DOCUMENTS

CN 103941905 A 7/2014
KR 1020140058977 A 5/2014

*Primary Examiner* — Nelson Rosario
*Assistant Examiner* — Scott Au
(74) *Attorney, Agent, or Firm* — Andrew C. Cheng

(57) ABSTRACT

The present invention discloses an in-cell touch screen and a driving method thereof. The method comprises: implementing scan to a display circuit in an active area and implementing scan to a touch control circuit in another active area in the meantime. With the aforementioned way, it can be prevented that the display circuit and the touch control circuit in the same active area are functioning at the same time. Accordingly, the mutual interference between the display circuit and the touch control circuit can be diminished to raise the touch control precision; meanwhile, the scans are implemented at the same time to the different circuits in two active areas and the scan time can be reduced.

6 Claims, 2 Drawing Sheets

(56) References Cited

U.S. PATENT DOCUMENTS

2014/0078104 A1* 3/2014 Lee .................. G06F 3/044
                                          345/174
2016/0018938 A1    1/2016 Ding et al.
2016/0216810 A1    7/2016 Zhao et al.

* cited by examiner

IN-CELL TOUCH SCREEN AND DRIVING METHOD THEREOF

FIELD OF THE INVENTION

The present invention relates to a touch control technology field, and more particularly to an in-cell touch screen and a driving method thereof.

BACKGROUND OF THE INVENTION

Touch screens can be categorized into the out-cell touch screen and the in-cell/on-cell touch screen. The out-cell touch screen is composed with an independent touch panel and an independent display panel laminated with each other. The in-cell/on-cell touch screen is to embed the touch control circuit into the display panel to realize the integration of the touch panel and the display panel. The in-cell touch screens can be further categorized into an in-cell touch screen and an on-cell touch screen. The in-cell touch screen is the technology that the touch control circuit is integrated into the liquid crystal pixels. The on-cell touch screen is the technology that the touch control circuit is integrated between the color filter and the polarizer. Compared with the other touch screens, the in-cell touch screen can allow the entire panel to be thinner.

As considering the in-cell touch screen, it is demanded to drive the touch control circuit for realizing the touch control function and the display circuit for realizing the display function respectively to achieve the touch control function and the display function. In the driving method of prior art, the scans to the touch control circuit and the display circuit are generally implemented at the same time. When the touch screen is driven to display, the detection for the touch operations to the touch screen is executed at the same time. However, the mutual interference problem can easily happen when the touch control circuit and the display circuit are functioning at the same time. For instance, when the scan is implemented to the display circuit, the transistor TFT flips, parasitic capacitance can be generated with the multi-touch sensor and coupled to the multi-touch sensor. Accordingly, the precision of the touch sense detection can be influenced; when the scan is implemented to the touch control circuit, the activation signals in the touch control detection operation can be coupled to the voltage level of the display circuit. The voltage level fluctuation of the display circuit can be affected and the image distortion can easily occur.

For solving the mutual interference issue, a scan method is proposed in the prior art that the active area is divided into two parts. In the first scan time section of the scan period, the scan is implemented to the display circuit of the first active area. In the second scan time section of the scan period, the scan to the touch control circuit is implemented for full screen. In the third scan time section of the scan period, the scan is implemented to the display circuit of the second active area. Accordingly, the mutual interference between the two circuits can be solved. However, with such arrangement, the scan to the touch control circuit will not start until the scan to the display circuit of the first active area is accomplished. The scan to the display circuit of the second active area will not start until the scan to the touch control circuit for full screen is accomplished. Thus, the scan time must increase.

SUMMARY OF THE INVENTION

The major technical issue that the present invention is to solve is to provide an in-cell touch screen and a driving method thereof which are capable of diminishing the mutual interference between the display circuit and the touch control circuit and reducing the scan time in the meantime.

For solving the aforesaid technical issues, one technical solution employed by the present invention is: to provide a driving method of an in-cell touch screen, and the driving method comprises: implementing scan to a display circuit in a first active area with a first scan frequency and implementing scan to a touch control circuit in a third active area with a second scan frequency in a first time section of a scan period; implementing scan to a display circuit in a second active area with the first scan frequency and implementing scan to a touch control circuit in a fourth active area with the second scan frequency in a second time section of the scan period; implementing scan to a touch control circuit in the first active area with the second scan frequency and implementing scan to a display circuit in the third active area with the first scan frequency in a third time section of the scan period; implementing scan to a touch control circuit in the second active area with the second scan frequency and implementing scan to a display circuit in the fourth active area with the first scan frequency in a fourth time section of the scan period; wherein the second active area is between the first active area and the third active area, and the third active area is between the second active area and the fourth active area, and the four active areas are sequentially arranged from top to bottom of the screen.

The first scan frequency and the second scan frequency are the same.

For solving the aforesaid technical issues, another solution provided by the present invention is: to provide a driving method of an in-cell touch screen, comprising: implementing scan to a display circuit in an active area and implementing scan to a touch control circuit in another active area in the meantime in a scan period.

The step of implementing scan to a display circuit in an active area and implementing scan to a touch control circuit in another active area in the meantime in the scan period comprises: implementing scan to a display circuit in a first active area with a first scan frequency and implementing scan to a touch control circuit in a third active area with a second scan frequency in a first time section of the scan period; implementing scan to a display circuit in a second active area with the first scan frequency and implementing scan to a touch control circuit in a fourth active area with the second scan frequency in a second time section of the scan period; implementing scan to a touch control circuit in the first active area with the second scan frequency and implementing scan to a display circuit in the third active area with the first scan frequency in a third time section of the scan period; implementing scan to a touch control circuit in the second active area with the second scan frequency and implementing scan to a display circuit in the fourth active area with the first scan frequency in a fourth time section of the scan period; wherein the second active area is between the first active area and the third active area, and the third active area is between the second active area and the fourth active area.

The step of implementing scan to a display circuit in an active area and implementing scan to a touch control circuit in another active area in the meantime in the scan period comprises: implementing scan to a display circuit in a first active area with a first scan frequency and implementing scan to a touch control circuit in a second active area with a second scan frequency in a first time section of the scan period; implementing scan to a touch control circuit in the first active area with the second scan frequency and implementing scan to a display circuit in the second active area with the first scan frequency in a second time section of the scan period.

The first active area is a top half active area of the screen, and the second active area is a bottom half active area of the screen; or the first active area is a left half active area of the screen, and the second active area is a right half active area of the screen.

The first scan frequency and the second scan frequency are the same.

For solving the aforesaid technical issues, another solution provided by the present invention is: to provide an in-cell touch screen, comprising scan drivers coupled to each other and a display panel, and the scan drivers are employed for implementing scan to a display circuit in an active area of the display panel and implementing scan to a touch control circuit in another active area of the display panel in the meantime in a scan period.

The display panel comprises the first active area, the second active area, the third active area and the fourth active area which are sequentially arranged, and the scan drivers comprise: a first control module, implementing scan to a display circuit in a first active area with a first scan frequency and implementing scan to a touch control circuit in a third active area with a second scan frequency in a first time section of the scan period; a second control module, implementing scan to a display circuit in a second active area with the first scan frequency and implementing scan to a touch control circuit in a fourth active area with the second scan frequency in a second time section of the scan period; a third control module, implementing scan to a touch control circuit in the first active area with the second scan frequency and implementing scan to a display circuit in the third active area with the first scan frequency in a third time section of the scan period; a fourth control module, implementing scan to a touch control circuit in the second active area with the second scan frequency and implementing scan to a display circuit in the fourth active area with the first scan frequency in a fourth time section of the scan period.

The display panel comprises a first active area and a second active area, and the scan drivers comprise: a first control module, implementing scan to a display circuit in a first active area with a first scan frequency and implementing scan to a touch control circuit in a second active area with a second scan frequency in a first time section of a scan period; a second control module, implementing scan to a touch control circuit in the first active area with the second scan frequency and implementing scan to a display circuit in the second active area with the first scan frequency in a second time section of the scan period.

The first active area is a top half active area of the screen, and the second active area is a bottom half active area of the screen; or the first active area is a left half active area of the screen, and the second active area is a right half active area of the screen.

The first scan frequency and the second scan frequency are the same.

The benefits of the present invention are: different from the prior arts, according to the driving method of the present invention, the scan to a display circuit in an active area and the scan to a touch control circuit in another active area are implemented in the meantime in the scan period. Thereby, the scans implemented to the display circuit and the touch control circuit in the same active area at the same time can be prevented. Accordingly, the mutual interference between the display circuit and the touch control circuit can be diminished. Meanwhile, the scans are implemented at the same time to the display circuit and the touch control circuit in different active areas. The scan to the circuit in an active area does not have to wait for completing the scan to the circuit in another active area. Thus, the scan time can be reduced.

DETAILED DESCRIPTION OF PREFERRED EMBODIMENTS

The present invention will be apparent from the following detailed description of an embodiment of the present invention, with reference to the attached drawings.

In one embodiment of a driving method according to the present invention, the touch screen is an in-cell touch screen. The employed display skill is the liquid crystal display technology. The employed touch control skill is the capacitive touch sense technology. Therefore, the in-cell touch screen comprises a display circuit employed for display function and a touch control circuit employed for touch control function. The display circuit comprises scan lines, data lines, thin film transistors TFT, pixel electrodes, et cetera to drive the liquid crystal panel for display. The touch control circuit comprises touch control driving electrodes and touch sense electrodes. Certainly, the display skill of the in-cell touch screen can employ OLED display technology or other display technologies. The touch control skill can be resistive ouch sense technology.

In this embodiment, the screen is at least divided into two active areas. In a scan period, the scan is implemented to a display circuit in an active area and the scan is implemented to a touch control circuit in another active area in the meantime. The scan implemented to the display circuit is to sequentially input scan signals for display to the scan lines for controlling the conductions of the thin film transistors TFT. Then, the data lines are employed to input data signals to the corresponding pixel electrodes through the conducted thin film transistors TFT to achieve the image display, accordingly. The scan implemented to the touch control circuit is to sequentially input scan signals for touch control to the touch control driving electrodes and then the touch sense electrodes receives touch sense signals to realize touch sense control function, accordingly.

With the driving method of this embodiment, it can be prevented that the display circuit and the touch control circuit in the same active area are functioning at the same time. Accordingly, the mutual interference between the display circuit and the touch control circuit can be diminished to raise the touch control precision; meanwhile, the scans are implemented at the same time to the different circuits in two active areas and the scan time can be reduced.

Figure 1:
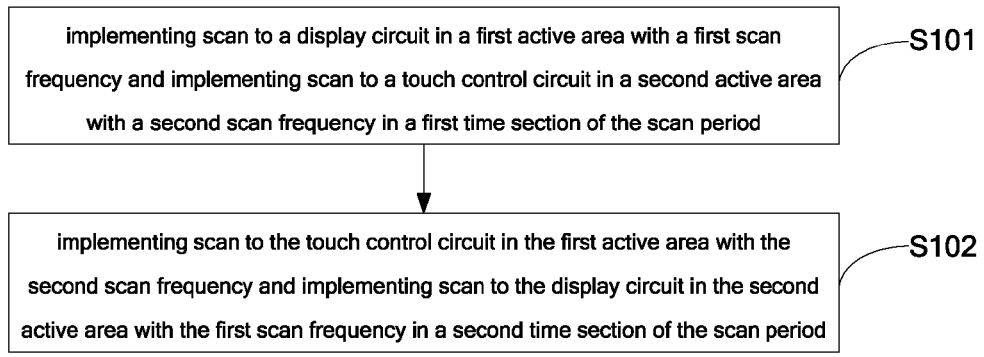
FIG. 1 is a flowchart of a driving method of an in-cell touch screen according to one embodiment of the present invention.

Please refer to FIG. 1. In one embodiment of the driving method of the in-cell touch screen according to the present invention, the screen is divided into two active areas, which respectively are a first active area and a second active area. The step of implementing scan to a display circuit in an active area and implementing scan to a touch control circuit in another active area in the meantime in the scan period comprises:

Step S101, implementing scan to a display circuit in a first active area with a first scan frequency and implementing scan to a touch control circuit in a second active area with a second scan frequency in a first time section of the scan period.

The scan period is divided into two time sections. In the first time section, the scan is merely implemented to a display circuit in a first active area but not to a touch control circuit in the first active area. In the meantime, the scan is merely implemented to a touch control circuit in a second active area but not to a display circuit in the second active area. Therefore, in the first time section, the scan to the display circuit in the first active area and the scan to the touch control circuit in the second active area are accomplished.

The first active area is a top half active area of the screen, and the second active area is a bottom half active area of the screen.

Certainly, in other embodiments, the first active area is a left half active area of the screen, and the second active area is a right half active area of the screen when the scan lines of the display circuit extend vertically and sequentially arranged horizontally.

Step S102: implementing scan to the touch control circuit in the first active area with the second scan frequency and implementing scan to the display circuit in the second active area with the first scan frequency in a second time section of the scan period.

In the second time section, the scan is implemented to the touch control circuit in the first active area. In the meantime, the scan is implemented to the display circuit in the second active area. Therefore, in the second time section, the scan to the touch control circuit in the first active area and the scan to the display circuit in the second active area are accomplished. Accordingly, the scan to the display circuits and the scan to the touch control circuits in one scan period are accomplished to realize the image display function and touch control function of the touch screen.

In this embodiment, the scan is implemented to the display circuit with a first scan frequency and the scan is implemented to the touch control circuit with a second scan frequency. The first scan frequency and the second scan frequency can be the same for guaranteeing the scan synchronization for the first active area and the second active area. Without doubt, the scan frequencies can be increased or decreased on demands of touch control precision or display effect. In the possible and allowable ranges, the first scan frequency and the second scan frequency can be different.

Consequently, by implementing time division scan to the display circuit and the touch control circuit in the same active area, it can be prevented that the display circuit and the touch control circuit in the same active area are functioning at the same time. Accordingly, the mutual interference between the display circuit and the touch control circuit can be diminished to raise the touch control precision; meanwhile, by implementing scans to the display circuit and the touch control circuit in different active areas at the same time and the scan time can be reduced.

Figure 2:
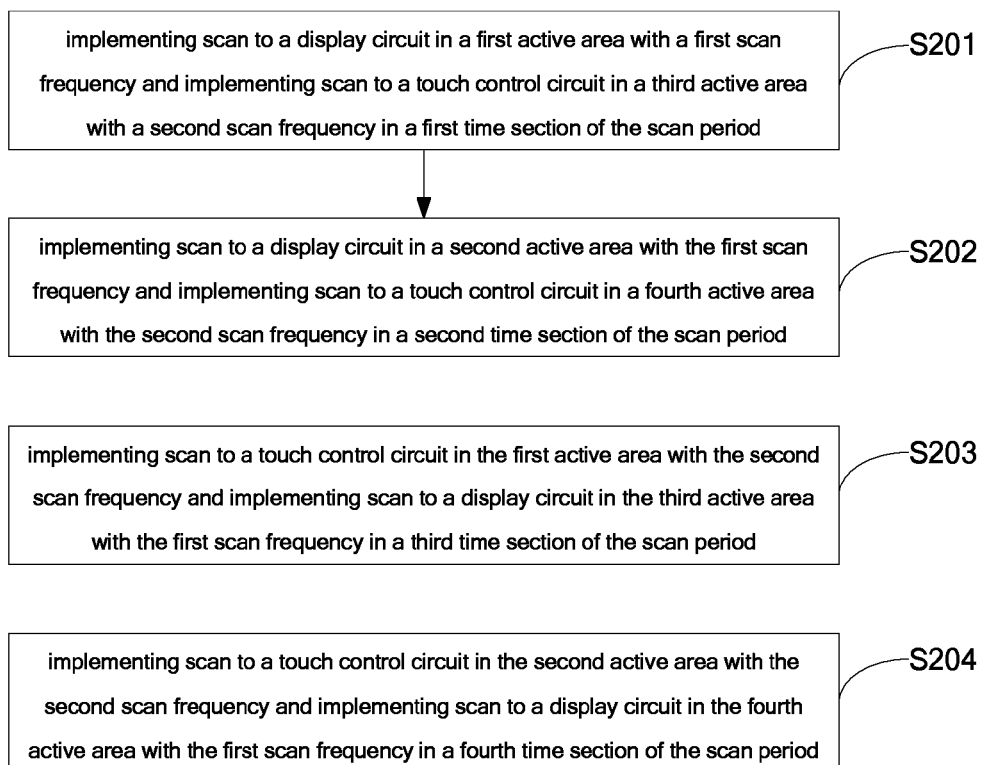
FIG. 2 is a flowchart of a driving method of an in-cell touch screen according to another embodiment of the present invention.

Please refer to FIG. 2. In another embodiment of the driving method of the in-cell touch screen according to the present invention, the screen is divided into four active areas, which respectively are a first active area, a second active area, a third active area and a fourth active area. Meanwhile, the scan period is correspondingly divided into four time sections. The step of implementing scan to a display circuit in an active area and implementing scan to a touch control circuit in another active area in the meantime in the scan period comprises:

Step S201: implementing scan to a display circuit in a first active area with a first scan frequency and implementing scan to a touch control circuit in a third active area with a second scan frequency in a first time section of the scan period;

Step S202: implementing scan to a display circuit in a second active area with the first scan frequency and implementing scan to a touch control circuit in a fourth active area with the second scan frequency in a second time section of the scan period;

Step S203: implementing scan to a touch control circuit in the first active area with the second scan frequency and implementing scan to a display circuit in the third active area with the first scan frequency in a third time section of the scan period;

Step S204: implementing scan to a touch control circuit in the second active area with the second scan frequency and implementing scan to a display circuit in the fourth active area with the first scan frequency in a fourth time section of the scan period.

Consequently, in one scan period, the scan to the display circuits and the scan to the touch control circuits are accomplished. In this embodiment, the first scan frequency and the second scan frequency can be the same. Moreover, the second active area is between the first active area and the third active area, and the third active area is between the second active area and the fourth active area. Accordingly, in the same time section, two different active areas implemented with the scans in the meantime are spaced with one active area inbetween. That is to say, two different circuits in two different active areas which are not adjacent are implemented with the scans in the meantime. For instance, the scan is implemented to the display circuit in the first active area and the scan is implemented to the touch control circuit in the third active area in the first time section. The first active area and the third active area are spaced with the second active area inbetween. Thereby, it can be prevented that the mutual interference occurs at the border of the two adjacent active areas when the scans to the circuit are implemented in the meantime. Accordingly, the touch control precision and the display effect can be promoted in advance. Meanwhile, by dividing the active area into four equal parts in cooperation with the aforesaid interleaving scans, the effect of the uniform scan can be achieved.

In the embodiments of the driving method of the in-cell touch screen according to the present invention, the active area can be divided into six or more active areas. By implementing time division scan to the display circuit and the touch control circuit in the same active area and implementing the scans to different circuits in the different active areas in the meantime, the touch control precision can be raised and the scan time can be reduced.

Figure 3:
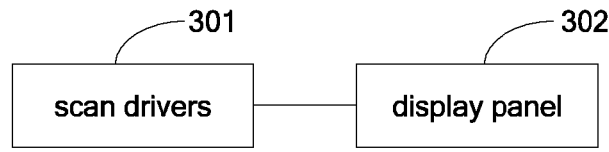
FIG. 3 is a structural diagram of an in-cell touch screen according to one embodiment of the present invention.

Please refer to FIG. 3. In one embodiment of the in-cell touch screen according to the present invention, the in-cell touch screen comprises scan drivers 301 coupled to each other and a display panel 302. The display skill is the liquid crystal display technology. The touch control skill of the in-cell touch screen is the capacitive touch sense technology. The scan drivers 301 are employed for implementing scan to a display circuit in an active area of the display panel 302 and implementing scan to a touch control circuit in another active area of the display panel 302 in the meantime in a scan period The display circuit comprises scan lines, data lines, thin film transistors TFT, pixel electrodes, et cetera to drive the liquid crystal panel for display. The touch control circuit comprises touch control driving electrodes and touch sense electrodes. The scan implemented to the display circuit is to sequentially input scan signals for display to the scan lines for controlling the conductions of the thin film transistors TFT. Then, the data lines are employed to input data signals to the corresponding pixel electrodes through the conducted thin film transistors TFT to achieve the image display, accordingly. The scan implemented to the touch control circuit is to sequentially input scan signals for touch control to the touch control driving electrodes and then the touch sense electrodes receives touch sense signals to realize touch sense control function, accordingly.

With the scan drivers of this embodiment, it can be prevented that the display circuit and the touch control circuit in the same active area are functioning at the same time. Accordingly, the mutual interference between the display circuit and the touch control circuit can be diminished to raise the touch control precision; meanwhile, the scans are implemented at the same time to the different circuits in two active areas and the scan time can be reduced.

Figure 4:
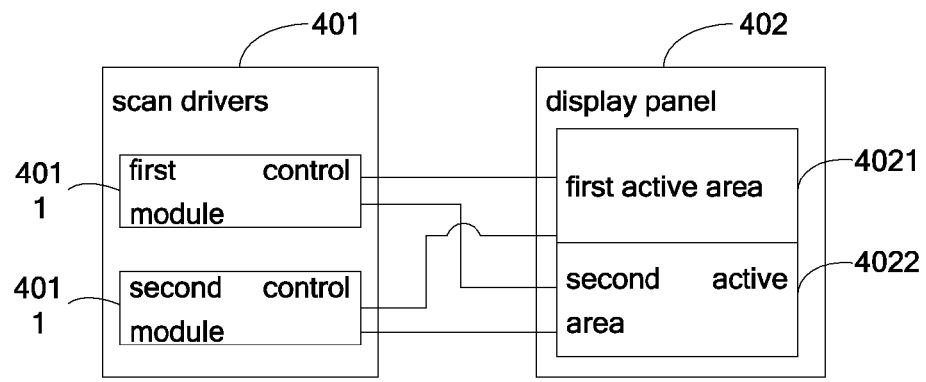
FIG. 4 is a structural diagram of an in-cell touch screen according to another embodiment of the present invention.

Please refer to FIG. 4. In one embodiment of the in-cell touch screen according to the present invention, the display panel 402 comprises a first active area 4021 and a second active area 4022. Correspondingly, the scan period is divided into two time sections, which respectively are a first time section and a second time section. The first active area 4021 is a top half active area of the screen, and the second active area 4022 is a bottom half active area of the screen. Certainly, the first active area 4021 can be a left half active area of the screen, and the second active area 4022 can be a right half active area of the screen.

The scan drivers 401 comprise a first control module 4011 and a second control module 4012. Both the first control module 4011 and the second control module 4012 integrate the functions of the display driver and the touch control driver.

The first control module 4011 is employed for implementing scan to a display circuit in a first active area 4021 with a first scan frequency and implementing scan to a touch control circuit in a second active area 4022 with a second scan frequency in a first time section of the scan period. The second control module 4012 is employed for implementing scan to a touch control circuit in the first active area 4021 with the second scan frequency and implementing scan to a display circuit in the second active area 4022 with the first scan frequency in a second time section of the scan period.

The first scan frequency and the second scan frequency are the same.

With the in-cell touch screen of this embodiment, the touch control precision and the display effect can be promoted and the scan time can be reduced.

Figure 5:
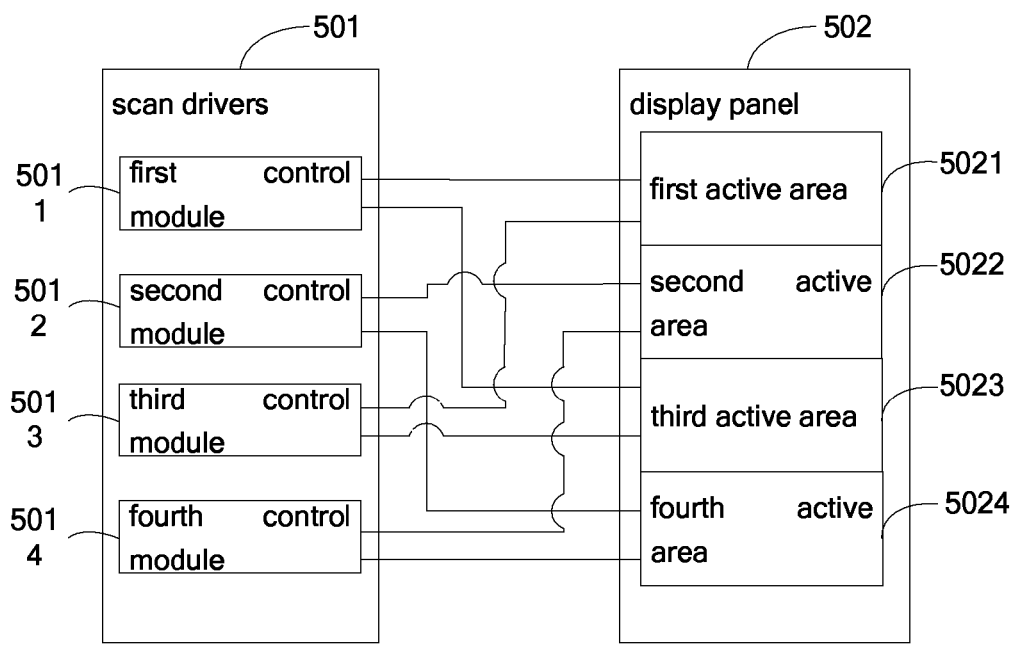
FIG. 5 is a structural diagram of an in-cell touch screen according to one another embodiment of the present invention.

Please refer to FIG. 5, In another embodiment of the in-cell touch screen according to the present invention, the display panel 502 comprises a first active area 5021, a second active area 5022, a third active area 5023 and a fourth active area 5024. The four active areas 5021, 5022, 5023, 5024 are sequentially arranged from top to bottom of the screen. Meanwhile, the scan period is correspondingly divided into four time sections. The scan drivers 501 comprise a first control module 5011, a second control module 5012, a third control module 5013 and a fourth control module 5014.

The first control module 5011 is employed for implementing scan to a display circuit in a first active area 5021 with a first scan frequency and implementing scan to a touch control circuit in a third active area 5023 with a second scan frequency in a first time section of the scan period. The second control module 5012 is employed for implementing scan to a display circuit in a second active area 5022 with the first scan frequency and implementing scan to a touch control circuit in a fourth active area 5024 with the second scan frequency in a second time section of the scan period. The third control module 5013 is employed for implementing scan to a touch control circuit in the first active area 5021 with the second scan frequency and implementing scan to a display circuit in the third active area 5023 with the first scan frequency in a third time section of the scan period. The fourth control module 5014 is employed for implementing scan to a touch control circuit in the second active area 5022 with the second scan frequency and implementing scan to a display circuit in the fourth active area 5024 with the first scan frequency in a fourth time section of the scan period.

The first scan frequency and the second scan frequency are the same.

In this embodiment, the second active area 5022 is between the first active area 5021 and the third active area 5023, and the third active area 5023 is between the second active area 5022 and the fourth active area 5024. Accordingly, in the same time section, two different active areas implemented with the scans in the meantime are spaced with one active area inbetween. That is to say, two different circuits in two different active areas which are not adjacent are implemented with the scans in the meantime. Thereby, it can be prevented that the mutual interference occurs at the border of the two adjacent active areas when the scans to the circuit are implemented in the meantime. Accordingly, the touch control precision and the display effect can be promoted in advance.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A driving method of an in-cell touch screen, wherein the method comprises:
   implementing scan to a display circuit in a first active area with a first scan frequency and implementing scan to a touch control circuit in a third active area with a second scan frequency in a first time section of a scan period;
   implementing scan to a display circuit in a second active area with the first scan frequency and implementing scan to a touch control circuit in a fourth active area with the second scan frequency in a second time section of the scan period;
   implementing scan to a touch control circuit in the first active area with the second scan frequency and implementing scan to a display circuit in the third active area with the first scan frequency in a third time section of the scan period;
   implementing scan to a touch control circuit in the second active area with the second scan frequency and implementing scan to a display circuit in the fourth active area with the first scan frequency in a fourth time section of the scan period;

wherein the second active area is between the first active area and the third active area, and the third active area is between the second active area and the fourth active area, and the four active areas are sequentially arranged from top to bottom of the screen;

wherein the first active area, the second active area, the third active area, and the fourth active area are respectively connected with a first control module, a second control module, a third control module, and a fourth control module, such that the active areas are respectively and separately controlled by the control modules to implement scans to each of the display circuits and each of the touch control circuits, wherein each of the control modules is connected to the display circuit of one of the active areas while connected to the touch control circuit of another one of the active areas that is different from the one of the active areas of which the display circuit is connected to the control module, such that the first control module is connected to the display circuit of the first active area and is also connected to the touch control circuit of the third active area, the second control module is connected to the display circuit of the second active area and is also connected to the touch control circuit of the fourth active area; the third control module is connected to the display circuit of the first active area and is also connected to the touch control circuit of the first active area, the fourth control module is connected to the display circuit of the fourth active area and is also connected to the touch control circuit of the second active area.

2. The driving method according to claim 1, wherein the first scan frequency and the second scan frequency are the same.

3. A driving method of an in-cell touch screen, comprising: implementing scan to a display circuit in an active area and implementing scan to a touch control circuit in another active area in the meantime in a scan period, wherein the active areas are each connected with a separate control module such that the active areas are respectively and separately controlled by the control modules to separately implement scans to the display circuit and the touch control circuit, wherein each of the control modules is connected to the display circuit of one of the active areas while connected to the touch control circuit of another one of the active areas that is different from the one of the active areas of which the display circuit is connected to the control module;

wherein the step of implementing scan to a display circuit in an active area and implementing scan to a touch control circuit in another active area in the meantime in the scan period comprises:

implementing scan to a display circuit in a first active area with a first scan frequency and implementing scan to a touch control circuit in a third active area with a second scan frequency in a first time section of the scan period;

implementing scan to a display circuit in a second active area with the first scan frequency and implementing scan to a touch control circuit in a fourth active area with the second scan frequency in a second time section of the scan period;

implementing scan to a touch control circuit in the first active area with the second scan frequency and implementing scan to a display circuit in the third active area with the first scan frequency in a third time section of the scan period;

implementing scan to a touch control circuit in the second active area with the second scan frequency and implementing scan to a display circuit in the fourth active area with the first scan frequency in a fourth time section of the scan period;

wherein the second active area is between the first active area and the third active area, and the third active area is between the second active area and the fourth active area; and wherein the control modules comprises first, second, third, and fourth control modules to which the first, second, third, and fourth active areas are respectively connected and controlled thereby to implement scans to the display circuits and the touch control circuits, wherein first control module is connected to the display circuit of the first active area and is also connected to the touch control circuit of the third active area, the second control module is connected to the display circuit of the second active area and is also connected to the touch control circuit of the fourth active area; the third control module is connected to the display circuit of the first active area and is also connected to the touch control circuit of the first active area, the fourth control module is connected to the display circuit of the fourth active area and is also connected to the touch control circuit of the second active area.

4. The driving method according to claim 3, wherein the first scan frequency and the second scan frequency are the same.

5. An in-cell touch screen, comprising scan drivers coupled to each other and a display panel that is divided into multiple active areas each provided with a display circuit and a touch control circuit, and the scan drivers are each employed for implementing scan to the display circuit of one of the active areas of the display panel and implementing scan to the touch control circuit in another one of the active areas of the display panel in the meantime in a scan period, wherein the scan drivers comprise control modules that are respectively and separately connected to the active areas such that the active areas are respectively and separately controlled by the control modules to implement scans to the display circuits and the touch control circuits, wherein each of the control modules is connected to the display circuit of one of the active areas while connected to the touch control circuit of another one of the active areas that is different from the one of the active areas of which the display circuit is connected to the control module;

wherein the multiple active areas of the display panel comprise a first active area, a second active area, a third active area and a fourth active area which are sequentially arranged, and the control modules of the scan drivers comprise:

a first control module, implementing scan to the display circuit of the first active area with a first scan frequency and implementing scan to the touch control circuit of the third active area with a second scan frequency in a first time section of the scan period;

a second control module, implementing scan to the display circuit of the second active area with the first scan frequency and implementing scan to the touch control circuit of the fourth active area with the second scan frequency in a second time section of the scan period;

a third control module, implementing scan to the touch control circuit of the first active area with the second scan frequency and implementing scan to the display circuit of the third active area with the first scan frequency in a third time section of the scan period; and a fourth control module, implementing scan to the touch control circuit of the second active area with the second scan frequency and implementing scan to the display circuit of the fourth active area with the first scan frequency in a fourth time section of the scan period;

wherein first control module is connected to the display circuit of the first active area and is also connected to the touch control circuit of the third active area, the second control module is connected to the display circuit of the second active area and is also connected to the touch control circuit of the fourth active area; the third control module is connected to the display circuit of the first active area and is also connected to the touch control circuit of the first active area, the fourth control module is connected to the display circuit of the fourth active area and is also connected to the touch control circuit of the second active area.

6. The in-cell touch screen according to claim 5, wherein the first scan frequency and the second scan frequency are the same.

* * * * *